US 7,746,585 B2

(12) United States Patent
Chang

(10) Patent No.: US 7,746,585 B2
(45) Date of Patent: Jun. 29, 2010

(54) LENS MODULE

(75) Inventor: Keng-Ming Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 338 days.

(21) Appl. No.: 11/742,721

(22) Filed: May 1, 2007

(65) Prior Publication Data

US 2008/0151401 A1 Jun. 26, 2008

(30) Foreign Application Priority Data

Dec. 22, 2006 (CN) .................... 2006 1 0157875.8

(51) Int. Cl.
*G02B 15/14* (2006.01)
*G02B 7/02* (2006.01)
*G02B 5/22* (2006.01)

(52) U.S. Cl. .................. 359/891; 359/704; 359/811; 359/819

(58) Field of Classification Search ............... 359/704, 359/811, 819, 891
See application file for complete search history.

(56) References Cited

U.S. PATENT DOCUMENTS

| | | | | |
|---|---|---|---|---|
| 4,392,723 A * | 7/1983 | Gehmann | .................... | 359/501 |
| 5,852,519 A * | 12/1998 | Do et al. | ...................... | 359/822 |
| 5,978,611 A * | 11/1999 | Yamamoto et al. | .......... | 396/429 |
| 6,452,732 B1 * | 9/2002 | Okada et al. | ................. | 359/813 |
| 7,149,039 B2 * | 12/2006 | Shimakura | ................... | 359/704 |
| 7,460,318 B2 * | 12/2008 | Chiang | ........................ | 359/819 |
| 2007/0058072 A1 | 3/2007 | Lee | | |

FOREIGN PATENT DOCUMENTS

| | | |
|---|---|---|
| CN | 2666062 | 12/2004 |
| CN | 2682447 | 3/2005 |

* cited by examiner

*Primary Examiner*—Jessica T Stultz
*Assistant Examiner*—Mahidere S Sahle
(74) *Attorney, Agent, or Firm*—Jeffrey T. Knapp

(57) ABSTRACT

An exemplary lens module includes a number of optical components, a barrel, a holder, a filter base, a filter carrying member, an infrared-cut filter and a visible-light-cut filter. The barrel is configured for receiving the optical components therein. The holder holds the barrel therein. The filter base is disposed in the barrel. The filter carrying member is movably mounted on the filter base. The infrared-cut filter and the visible-light-cut filter are mounted on the filter carrying member. The filter carrying member is movable relative to the filter base so as to selectively bring either the infrared-cut filter or the visible-light-cut filter into optical alignment with the optical components in the barrel. The lens module can be capable of performing infrared and visible-spectrum photography.

20 Claims, 3 Drawing Sheets

LENS MODULE

BACKGROUND

1. Technical Field

The present invention relates to lens modules, and more particularly to a lens module that is capable of performing infrared and visible-spectrum photography.

2. Description of Related Art

Nowadays, camera modules are now in widespread use. Camera modules are being combined with various portable electronic devices such as mobile phones, PDAs (personal digital assistants) and computers to be increasingly multi-functional.

A typical camera module generally includes a lens module. The lens module is a very important component of the camera module. The lens module is coupled with an image sensor such as a charge coupled device (CCD) or a complementary metal oxide semiconductor (CMOS) so as to capture images. Generally speaking, the image sensor reacts to light both in the visible spectrum and in the infrared spectrum. Light in the infrared spectrum can cause interference that causes the image sensor signal-to-noise ratio to be reduced, when the lens module is used in natural light conditions for visible-spectrum photography. Therefore, an infrared-cut filter that blocks light in the infrared spectrum is fitted in the lens module to prevent such interference.

However, such lens module having an infrared-cut filter fitted therein is only capable of performing visible-spectrum photography. Thus use of the lens module is restricted to some extent. For example, such a lens module cannot ideally be used in dark environments for photography because of the lack of visible-spectrum. Although infrared is emitted by all objects all the time, even in dark environments, the lens module cannot be used for infrared photography due to infrared light being blocked by the infrared-cut filter.

What is needed, therefore, is a lens module that is capable of performing both infrared and visible-spectrum photography.

SUMMARY

One preferred embodiment includes a lens module. The lens module includes a number of optical components, a barrel, a holder, a filter base, a filter carrying member, an infrared-cut filter and a visible-light-cut filter. The barrel is configured (i.e., structured and arranged) for receiving optical components therein. The holder has a cavity therein for holding the barrel. The filter base is disposed in the barrel. The filter carrying member is movably mounted on the filter base. The visible-light-cut filter and the infrared-cut filter are mounted on the filter carrying member. The filter carrying member is movable relative to the filter base so as to selectively bring either the infrared-cut filter or the visible-light-cut filter into optical alignment with the optical components in the barrel.

BRIEF DESCRIPTION OF THE DRAWINGS

Many aspects of the present lens module can be better understood with reference to the following drawings. The components in the drawings are not necessarily drawn to scale, the emphasis instead being placed upon clearly illustrating the principles of the present lens module. Moreover, in the drawings, like reference numerals designate corresponding parts throughout the several views.

DETAILED DESCRIPTION OF THE EMBODIMENTS

Embodiment will now be described in detail below and with reference to the drawings.

Figure 1:
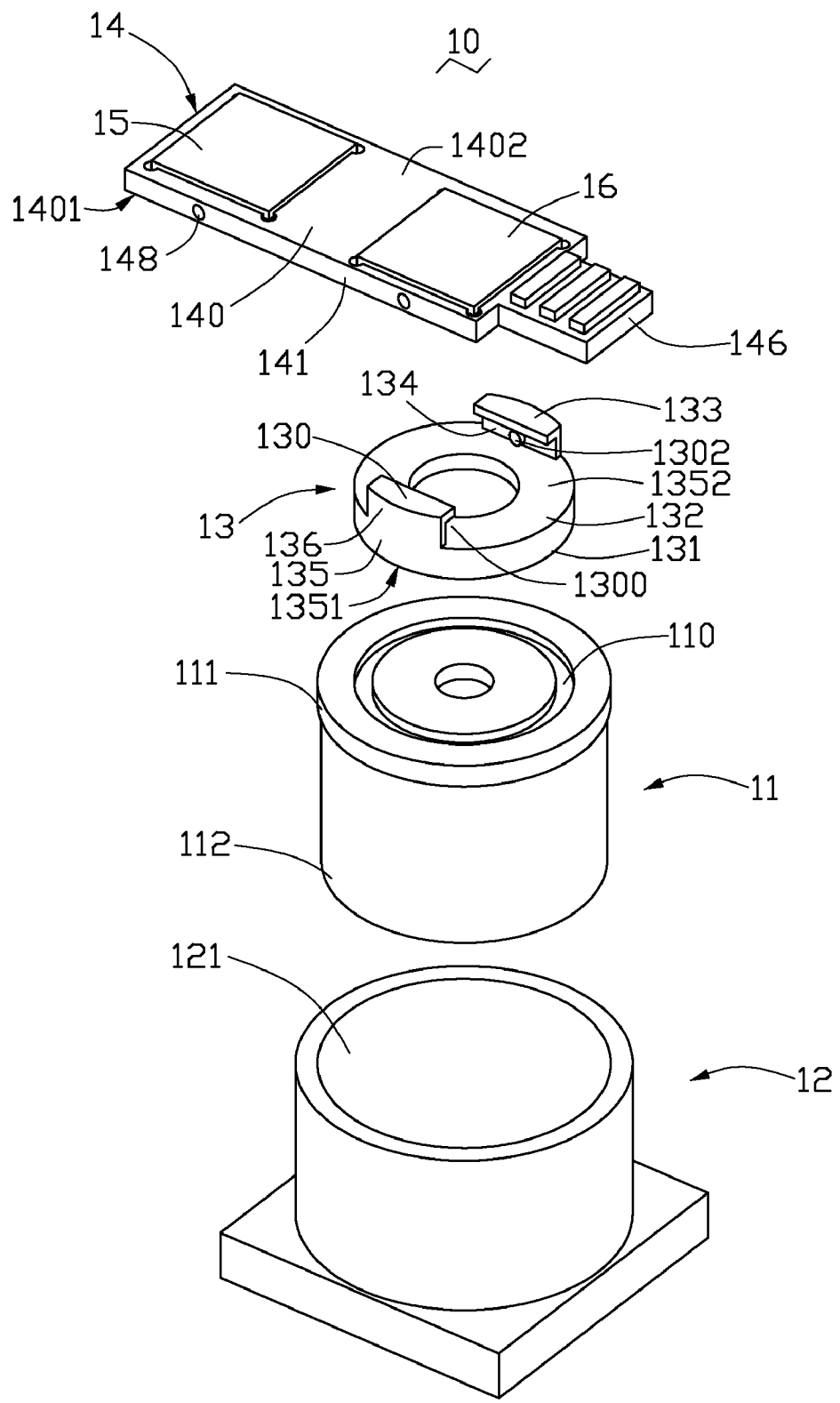
FIG. 1 is a schematic exploded view of a lens module according to a preferred embodiment.
Figure 2:
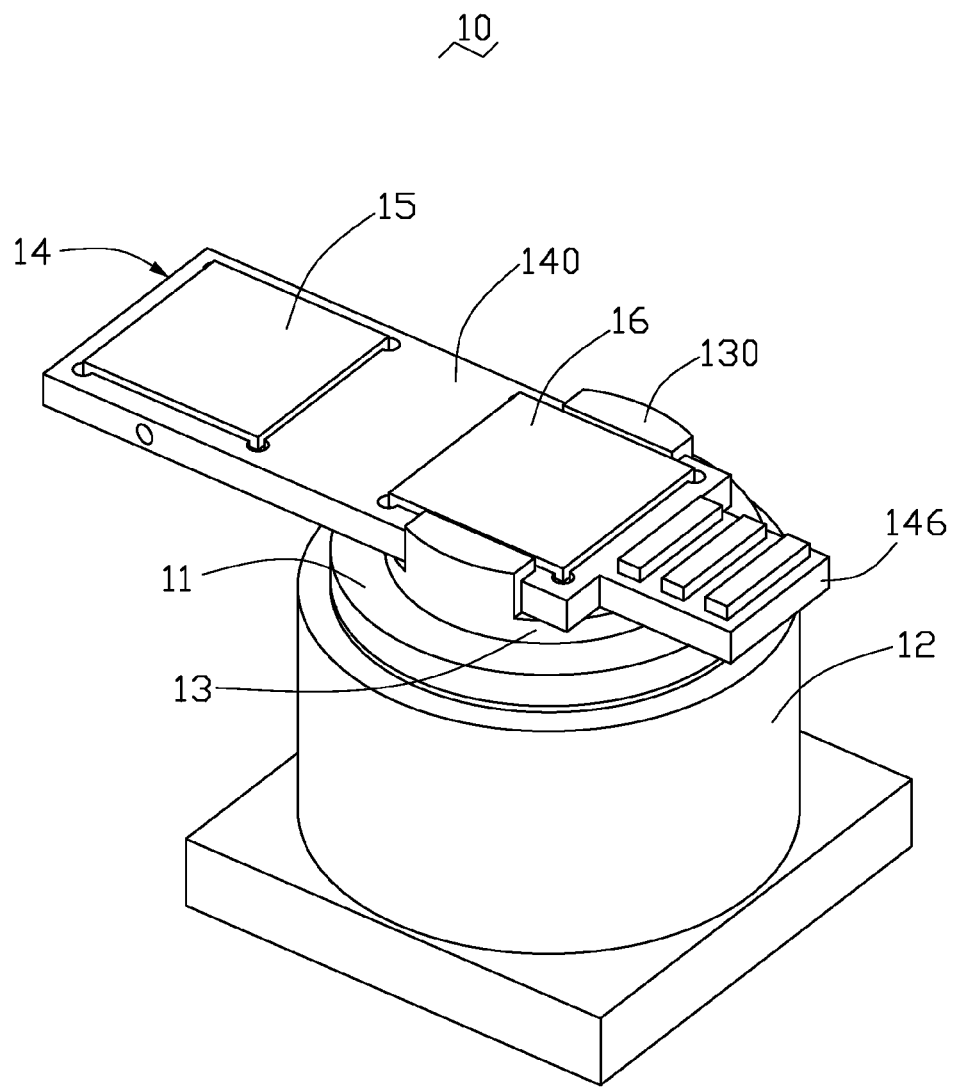
FIG. 2 is an schematic assembled view of the lens module shown in FIG. 1.

Referring to FIG. 1 to FIG. 2, an exemplary lens module 10, according to a preferred embodiment, includes a number of optical components (not shown), a barrel 11, a holder 12, a filter base 13, a filter carrying member 14, an infrared-cut filter 15, and a visible-light-cut filter 16.

The barrel 11 is substantially in the form of a hollow cylinder and is received in the holder 12. For example, the barrel 11 can partially be screwed into the holder 12. The barrel 11 is configured (i.e., structured and arranged) for receiving the optical components (not shown) therein. These optical components generally include at least a lens. The optical components are configured for providing functions such as variable focusing for the lens module 10. The barrel 11 includes a first end 111 and an opposite second end 112. The first end 111 of the barrel 11 defines an annular socket 110 therein. A central axis of the annular socket 110 and a central axis of the barrel 11 are essentially coaxial. The second end 112 is received, by, for example, being partially screwed into the holder 12.

The holder 12 defines a cavity 121 therein. The cavity 121 is configured for receiving the barrel 11. An image sensor (not shown) is received in the holder 12 and generally is disposed at an image side of the lens module 10. The optical components in the barrel 11 optically communicate with the image sensor in the holder 12 to capture images.

The filter base 13 has a cylindrical configuration essentially. The filter base 13 includes a main body 135 and two catch protrusions 130. The main body 135 has a first end 131 with a bottom surface 1351 and an opposite second end 132 with a top surface 1352. The first end 131 of the main body 135 of the filter base 13 can be evenly engaged in the annular socket 110 located at the first end 111 of the barrel 11, such that a central axis of the filter base 13 is essentially coaxial with the central axis of the annular socket 110. Therefore the filter base 13 can be directly fitted to the barrel 11, whereby the bottom surface 1351 of the main body 135 can be engaged with the barrel 11 in the annular socket 110. A method for connecting the filter base 13 and the barrel 11 firmly can include cementation. For example, the first end 131 of the main body 135 of the filter base 13 and the annular socket 110 of the barrel 11 can have glue or the like applied thereto before the first end 131 of the main body 135 of the filter base 13 is engaged in the annular socket 110 of the barrel 11. The two catch protrusions 130 are arranged substantially symmetrically opposite to each other, and extend from the top surface 1352 of the second end 132 of the main body 135 of the filter base 13. Each of the catch protrusions 130 includes a main portion 136 and a bent portion 133 extending from a top end of the main portion 136. The main portion 136 of each catch protrusion 130 extends from the top surface 1352 of the main body 135 along a direction substantially parallel to the central axis of the filter base 13. In other words, the main portion 136 is substantially perpendicular to the top surface 1352 of the main body 135 of the filter base 13 and is substantially parallel with the central axis of the barrel 11. The bent portion 133 of each catch protrusion 130 is bent inwardly relative to the main portion 136 toward a direction substantially perpendicular to the central axis of the filter base 13. That is, the bent portion 133 is substantially parallel with the top surface 1352 of the main body 135 and is substantially perpendicular to the central axis of the barrel 11. Thus, the main portion 136 of the catch protrusion 130, the bent portion 133 of the catch protrusion 130, and the top surface 1352 of the main body 135 of the filter base 13 cooperatively define a receiving space 1300. The two opposite catch protrusions 130 are configured for holding the filter carrying member 14 therebetween. That is, the filter carrying member 14 can be movably received in the receiving spaces 1300. In one example, the filter carrying member 14 can move on the filter base 13 in a sliding manner. The two opposite catch protrusions 130 are configured for guiding a sliding direction of the filter carrying member 14.

Each of the catch protrusions 130 has a projection 1302 formed on an inner wall 134 of the main body 135 thereof. The projection 1302 on one catch protrusion 130 faces toward the projection 1302 on the other catch protrusion 130. In the illustrated embodiment, the projection 1302 is formed in a middle position of the inner wall 134 of each catch protrusion 130. The projection 1302 is for example small and substantially cylindrical, or may be hemispherical; and may be elastic, and so on. The two projections 1302 can be engaged in corresponding recesses 148 defined in the filter carrying member 14, thereby fixing the filter carrying member 14 on the filter base 13 in a suitable position. The two projections 1302 can also easily be driven away from the recesses 148 by an outside force applied on the filter carrying member 14 so that the filter carrying member 14 can slide on the filter base 13. Additionally, it is also feasible that only one of the catch protrusions 130 has a projection 1302, or that more than one projection 1302 is formed on each of the catch protrusions 130.

The filter carrying member 14 can be inserted between the two catch protrusions 130, and thus be movably mounted on the filter base 13. In the preferred embodiment, the filter carrying member 14 can move on the filter base 13 by sliding.

Figure 3:
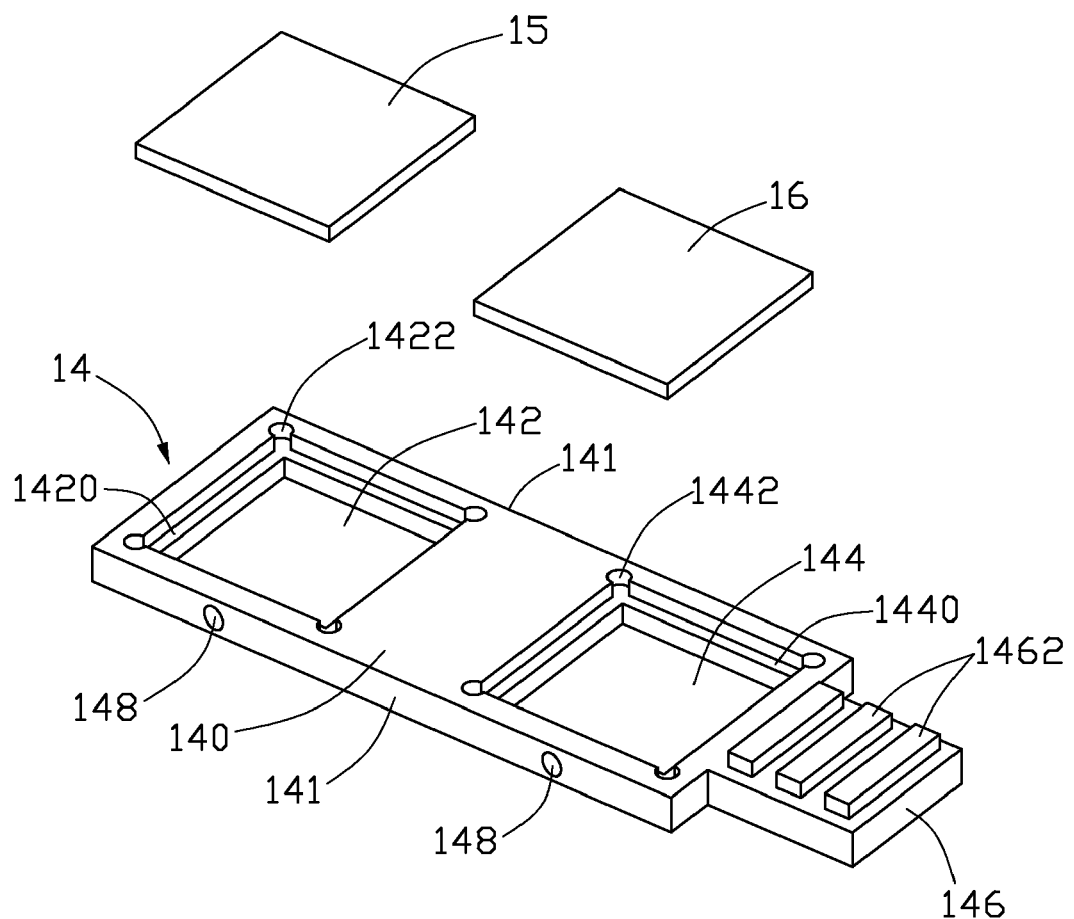
FIG. 3 is a schematic exploded view of a filter carrying member, an infrared-cut filter and a visible-light-cut filter according to a preferred embodiment.

Referring also to FIG. 3, the filter carrying member 14 includes a main strip 140. The main strip 140 has a rectangular configuration. The main strip 140 includes a bottom wall 1401, a top wall 1402, and two opposite sidewalls 141 interconnecting the bottom wall 1401 and the top wall 1402. A width of the main strip 140 (i.e., a distance between the two sidewalls 141) is a little less than a distance between the two opposite inner walls 134 of the two catch protrusions 130, and a thickness of the main strip 140 (i.e., a distance between the bottom wall 1401 and the top wall 1402) is a little less than a height of the main portions 136 of the two catch protrusions 130. When the filter carrying member 14 is movably inserted and disposed between the two catch protrusions 130 and thus movably received in the receiving spaces 1300, the main strip 140 is substantially in slidable contact with the filter base 13 in such a manner that the bottom wall 1401 of the main strip 140 is substantially in slidable contact with the top surface 1352 of the main body 135 of the filter base 13, the top wall 1402 of the main strip 140 is substantially in slidable contact with the bent portions 133 of the catch protrusions 130 of the filter base 13, and the two sidewalls 141 substantially slidably and directly contact the two opposite inner walls 134 of the two catch protrusions 130.

The main strip 140 defines a first opening 142 and a second opening 144 both exposed at the top wall 1402 and the bottom wall 1401. A configuration of the first opening 142 matches with that of the infrared-cut filter 15. The first opening 142 is configured for receiving the infrared-cut filter 15. The first opening 142 is a stepped hole and has a first supporting surface 1420 therein, the first supporting surface 1420 being parallel with the top wall 1402. The first opening 142 can be square, rectangular or circular in shape. In the illustrated embodiment, the first opening 142 is square in shape, and the first supporting surface 1420 is correspondingly rectangular in shape. Preferably, the main strip 140 defines at least a first gluing cutout 1422 communicating with the first opening 142. Thus, glue or the like can be applied onto parts of the main strip 140, including the first supporting surface 1420, that are to be put into contact with the infrared-cut filter 15, thereby attaching the infrared-cut filter 15 to the main strip 140 including at the first supporting surface 1420. The infrared-cut filter 15 can thus be firmly received in the first opening 142. For the square first opening 142, in the illustrated embodiment, the first opening 142 defines four first gluing cutouts 1422. Each of the first gluing cutouts 1422 communicates with the first opening 142 and is configured for receiving glue.

The second opening 144 is similar to the first opening 142. A configuration of the second opening 144 matches with that of the visible-light-cut filter 16. The second opening 144 is configured for receiving the visible-light-cut filter 16. The second opening 144 is a stepped hole and has a second supporting surface 1440 therein, the second supporting surface 1440 being parallel with the top wall 1402. The second opening 144 also can be square, rectangular or circular in shape. In the illustrated embodiment, the second opening 144 is also square in shape, and the second supporting surface 1440 is correspondingly rectangular in shape. Preferably, the main strip 140 defines at least a second gluing cutout 1442 communicating with the second opening 144. Thus, glue or the like can be applied onto parts of the main strip 140, including the second supporting surface 1440, that are to be put into contact with the visible-light-cut filter 16, thereby attaching the visible-light-cut filter 16 to the main strip 140 including at the second supporting surface 1440. The light-cut filter 16 can thus be firmly received in the second opening 144. For the square second opening 144, in the illustrated embodiment, the second opening 144 defines four second gluing cutouts 1442. Each of the second gluing cutouts 1442 communicates with the second opening 144 and is configured for receiving glue.

The two opposite sidewalls 141 of the main strip 140 define a number of recesses 148 therein. The recesses 148 can engagingly receive the projections 1302 of the two catch protrusions 130, thereby fixing the filter carrying member 14 on the filter base 13 in a suitable position.

In the preferred embodiment, each sidewall 141 of the main strip 140 defines two recesses 148 therein. One recess 148 on one sidewall 141 and one recess 148 on the other sidewall 141 are on opposite sides of the filter carrying member 14. The two opposite recesses 148 on the two sidewalls 141 are positioned corresponding to the first opening 142. The other recess 148 on one sidewall 141 and the other recess 148 on the other sidewall 141 are also on opposite sides of the filter carrying member 14. The two opposite recesses 148 on the two sidewalls 141 are positioned corresponding to the second opening 144. The filter carrying member 14 slides on the filter base 13. Therefore, when the projections 1302 is engaged in the recesses 148 corresponding to the first opening 142, the filter carrying member 14 can be fixed on the filter base 13 so as to bring the infrared-cut filter 15 in the first opening 142 into optical alignment with the optical components in the barrel 11. The filter carrying member 14 can move on the filter base 13 continually under an outside force, because the two projections 1302 can be separated from the recesses 148 easily by outside force. Therefore, when the projections 1302 are engaged in the recesses 148 corresponding to the second opening 144, the filter carrying member 14 can be fixed on the filter base 13 again so as to bring the visible-light-cut filter 16 in the second opening 144 into optical alignment with the optical components in the barrel 11. The recesses 148 corresponding to the first opening 142 or corresponding to the second opening 144 should be consistent in number with the projections 1302 disposed on the two catch protrusions 130.

The filter carrying member 14 further includes a manipulating portion 146. The manipulating portion 146 extends from one end of the main strip 140. In the preferred embodiment, the manipulating portion 146 extends from the end of the main strip 140 that is nearest to the second opening 144. The main strip 140 can move on the filter base 13 by pushing or pulling the manipulating portion 146. Preferably, at least a protuberant rib 1462 can be formed on the manipulating portion 146, thereby facilitating control. In the preferred embodiment, three parallel protuberant ribs 1462 are formed on the manipulating portion 146.

The infrared-cut filter 15 is mounted on the filter carrying member 14. When the filter carrying member 14 brings the infrared-cut filter 15 into optical alignment with the optical components in the barrel 11, the infrared-cut filter 15 is configured for transmitting light in the visible spectrum while blocking light in the infrared spectrum and is used to protect the image sensor from interference from infrared radiation. The image sensor can receive light in the visible spectrum and thus create visible-spectrum images.

The visible-light-cut filter 16 is mounted on the filter carrying member 14. When the filter carrying member 14 brings the visible-light-cut filter 16 into optical alignment with the optical components in the barrel 11, the visible-light but filter 16 is configured for transmitting light in the infrared spectrum while blocking light in the visible spectrum and is used to protect the image sensor from interference from visible-light. The image sensor can receive light in the infrared spectrum and thus create infrared images.

The barrel 11, the holder 12, the filter base 13, the filter carrying member 14, the infrared-cut filter and the visible-light-cut filter 16 are assembled (as shown in FIG. 2), thereby forming the lens module 10. The filter carrying member 14 can slide along the filter base 13 by pushing or pulling the manipulating portion 146, and thus the lens module 10 can bring either the infrared-cut filter 15 or the visible-light-cut filter 16 into optical alignment with the optical components in the barrel 11. When the infrared-cut filter 15 is brought into optical alignment with the optical components in the barrel 11, the lens module 10 is capable of performing visible-spectrum photography. That is, the lens module 10 can be used in visible-light conditions. When the visible-light-cut filter 16 is brought into optical alignment with the optical components in the barrel 11, the lens module 10 is capable of performing infrared photography. That is, the lens module 10 can be used in infrared conditions or in dark environments.

Additionally, it is also feasible that the filter carrying member 14 may be movably mounted on the first end 111 of the barrel 11 in other manners. For example, the filter carrying member 14 can change its position by revolving on the first end 111 of the barrel 11. The filter carrying member 14 can also be moved relative to the filter base and is configured for selectively bringing either the infrared-cut filter or the visible-light-cut filter into a position for blocking the interferential light according to various requirements. Moreover, the filter carrying member 14 also can be disposed anywhere the filter is needed in a manner similar to lens module 10. For example, the filter carrying member 14 can be disposed at the second end 112 of the barrel 11, and be disposed between an image sensor received in the holder 12 and the optical components in the barrel 11.

While certain embodiment has been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens module, comprising:
   a plurality of optical components;
   a barrel receiving the optical components therein;
   a holder having a cavity therein for holding the barrel;
   a filter base disposed at the barrel, the filter base comprising a main body and two opposite catch protrusions each comprising a main portion and a bent portion, the main portion extending from the main body along a direction substantially parallel with a central axis of the barrel, the bent portion extending from an end of the main portion toward the other catch protrusion along a direction substantially perpendicular to the central axis of the barrel;
   a filter carrying member movably mounted on the filter base in such a manner that the filter carrying member is disposed between the two catch protrusions and substantially in slidable contact with the main body and the bent portion and the main portion of each catch protrusion;
   an infrared-cut filter; and
   a visible-light-cut filter;
   the infrared-cut filter and the visible-light-cut filter being mounted on the filter carrying member which is movable relative to the filter base so as to selectively bring either the infrared-cut filter or the visible-light-cut filter into optical alignment with the optical components in the barrel.

2. The lens module as claimed in claim 1, wherein the barrel has a first end and an opposite second end, the filter base being disposed at the first end of the barrel and away from the holder, the second end of the barrel being received in the holder.

3. The lens module as claimed in claim 2, wherein the barrel defines a coaxial annular socket at the first end thereof, and the filter base has a first end and an opposite second end, the first end of the filter base being engaged in the annular socket.

4. The lens module as claimed in claim 1, wherein at least a projection is formed on an inner wall of the main body of each of the catch protrusions, and the filter carrying member has corresponding recesses defined therein for engagingly receiving the at least one projection.

5. The lens module as claimed in claim 1, wherein the filter carrying member defines a first opening and a second opening therein, the infrared-cut filter being received in the first opening, and the visible-light-cut filter being received in the second opening.

6. The lens module as claimed in claim 5, wherein a shape of the first opening is selected from a group consisting of square, rectangular and circular, and a shape of the second opening is selected from a group consisting of square, rectangular and circular.

7. The lens module as claimed in claim 5, wherein the filter carrying member defines at least a first gluing cutout in communication with the first opening for receiving glue, thereby allowing adherence of the infrared-cut filter on the filter carrying member in the first opening.

8. The lens module as claimed in claim 7, wherein the filter carrying member further defines at least a second gluing cutout in communication with the second opening for receiving glue, thereby allowing adherence of the visible-light-cut filter on the filter carrying member in the second opening.

9. The lens module as claimed in claim 5, wherein the filter carrying member comprises a main strip having a rectangular configuration, the first opening and the second opening being defined in the main strip.

10. The lens module as claimed in claim 9, wherein the filter carrying member further comprises a manipulating portion for facilitating manual movement on the filter base.

11. The lens module as claimed in claim 10, wherein at least a protuberant rib is formed on the manipulating portion.

12. A lens module, comprising:
a plurality of optical components;
a barrel receiving the optical components therein;
a holder having a cavity therein for holding the barrel;
a filter base attached to the barrel, the filter base comprising a main body and two opposite catch protrusions each comprising a main portion and a bent portion, the main portion extending from the main body along a direction substantially parallel with a central axis of the barrel, the bent portion extending from a top end of the main portion toward the other catch protrusion, such that the main body and the main portion and the bent portion of each of the catch protrusions cooperatively define a receiving space;
a filter carrying member movably mounted on the main body of the filter base, the filter carrying member being received in the receiving spaces and positioned between and substantially in slidable contact with the main body and the bent portion and the main portion of each catch protrusion;
an infrared-cut filter; and
a visible-light-cut filter;
the infrared-cut filter and the visible-light-cut filter being mounted on the filter carrying member, which is slidable relative to the filter base so as to selectively bring either the infrared-cut filter or the visible-light-cut filter into optical alignment with the optical components in the barrel.

13. The lens module as claimed in claim 12, wherein the bent portion extends along a direction substantially perpendicular to the central axis of the barrel.

14. The lens module as claimed in claim 12, wherein the main body has a bottom surface and a top surface, the bottom surface is engaged with the barrel, the catch protrusions extend from the top surface, the main portion of each catch protrusion is substantially perpendicular to the top surface, and the bent portion of each catch protrusion is substantially parallel with the top surface.

15. The lens module as claimed in claim 14, wherein the barrel defines a coaxial annular socket at an end thereof, and the bottom surface is engaged with the annular socket.

16. The lens module as claimed in claim 14, wherein the filter carrying member comprises a main strip, the main strip has a bottom wall, a top wall, and two opposite sidewalls interconnecting the bottom wall and the top wall, the bottom wall is substantially in slidable contact with the top surface, the top wall is substantially in slidable contact with the bent portion of each catch protrusion, and the sidewalls substantially slidably and directly contact the main portion of each catch protrusion.

17. The lens module as claimed in claim 16, wherein the main strip defines a first opening and a second opening both exposed at the top wall and the bottom wall, the first opening is configured for receiving the infrared-cut filter, and the second opening is configured for receiving the visible-light-cut filter.

18. The lens module as claimed in claim 17, wherein the first opening is a stepped hole and has a first supporting surface therein, the second opening is a stepped hole and has a second supporting surface therein, the first supporting surface and the second supporting surface are both parallel with the top wall, the infrared-cut filter is attached to the first supporting surface, and the visible-light-cut filter is attached to the second supporting surface.

19. The lens module as claimed in claim 12, wherein the filter carrying member comprises a main strip, the main strip has a bottom wall and a top wall, the main strip defines a first opening and a second opening both exposed at the top wall and the bottom wall, the first opening is configured for receiving the infrared-cut filter, and the second opening is configured for receiving the visible-light-cut filter.

20. The lens module as claimed in claim 19, wherein the first opening is a stepped hole and has a first supporting surface therein, the second opening is a stepped hole and has a second supporting surface therein, the first supporting surface and the second supporting surface are both parallel with the top wall, the infrared-cut filter is attached to the first supporting surface, and the visible-light-cut filter is attached to the second supporting surface.

* * * * *